Aug. 5, 1969

P. K. HSIEH 3,460,043

PRIORITY CIRCUITS

Filed April 6, 1966

3 Sheets-Sheet 1

INVENTOR.
PETER K. HSIEH
BY
[signature]
Attorney

INVENTOR.
PETER K. HSIEH
BY
Samuel Cohen
Attorney

Aug. 5, 1969 P. K. HSIEH 3,460,043

PRIORITY CIRCUITS

Filed April 6, 1966 3 Sheets-Sheet 3

INVENTOR.
PETER K. HSIEH

BY [signature]

Attorney

United States Patent Office 3,460,043
Patented Aug. 5, 1969

3,460,043

PRIORITY CIRCUITS

Peter K. Hsieh, Cherry Hill, N.J., assignor to RCA Corporation, a corporation of Delaware Filed Apr. 6, 1966, Ser. No. 540,722
Int. Cl. H03k *19/08, 19/12*
U.S. Cl. 328—92 11 Claims

ABSTRACT OF THE DISCLOSURE

Priority request signals are applied, each via two different paths, to respective priority granting circuits. Each path includes gate means and, in response to the concurrent receipt of more than one such signal, the gate means in all except one path to one priority granting circuit are blocked. Upon termination of the operation called for by the accepted priority request signal, the system automatically becomes conditioned to grant priority to a different priority request signal.

Electrical systems of complex design often include major components which perform similar functions but which are not all in use at the same time. These components can be expensive and it therefore can be advantageous first to reduce their number, and then to "time share" their use.

An example of an application in which the technique above is employed is a particular, relatively large, data processing system. This system has a main memory and several basic processing units. Any one of the processing units must be capable of accessing the memory upon demand or at least within a reasonable time after a request for access is made.

The circuit of the present invention permits this type of operation. The circuit can be set to permit the first arriving of a number of "requests for service" from the processing units to control the memory. Or, the circuit can be set to permit one request for service to have priority over another, even if the one request arrives not later than a given time interval after the other request. In each case, when one basic processing unit assumes control of the memory, the present circuit prevents the other such units from obtaining access to the memory.

Another feature of the present circuit is that it is capable of discriminating among a number of requests for service which are present concurrently. The circuit initially may be set to grant priority to a particular one of several concurrent requests and to ignore the remaining requests. Upon the termination of the request for access from one basic processing unit, the present circuit automatically grants priority to one of the other units which have requested access.

Some other advantages of the present circuit are its high speed and its relatively low cost.

The invention is discussed in greater detail below and is shown in the following drawings, of which:

FIGURES 1*a* and 1*b* are diagrams of the gates employed in the circuits of FIGURES 2 and 3. The Boolean equations next to the gates describe their operation;

FIGURE 1*c* is a drawing of the flip-flop employed in the circuits of FIGURES 2 and 3 and includes also a truth table for the flip-flop;

The blocks making up the figures are circuits which receive electrical signals indicative of binary digits (bits) and which produce outputs indicative of bits. It is arbitrarily assumed, for the purpose of the explanation which follows, that a relatively high level signal represents the bit 1 and a relatively low level signal represents the bit 0. For the sake of brevity, it is sometimes stated in the explanation that a 1 or a 0 is supplied to or obtained from a stage rather than saying that a signal representing a 1 or a 0 is applied to or obtained from the stage.

Figure 1A:
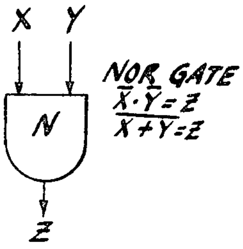
Figure 1B:
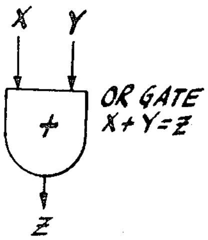
Figure 1C:
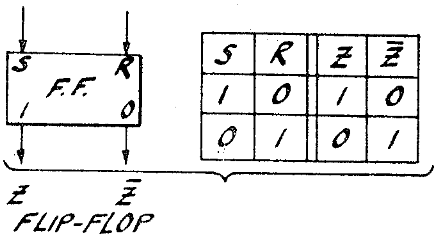
Figure 2:
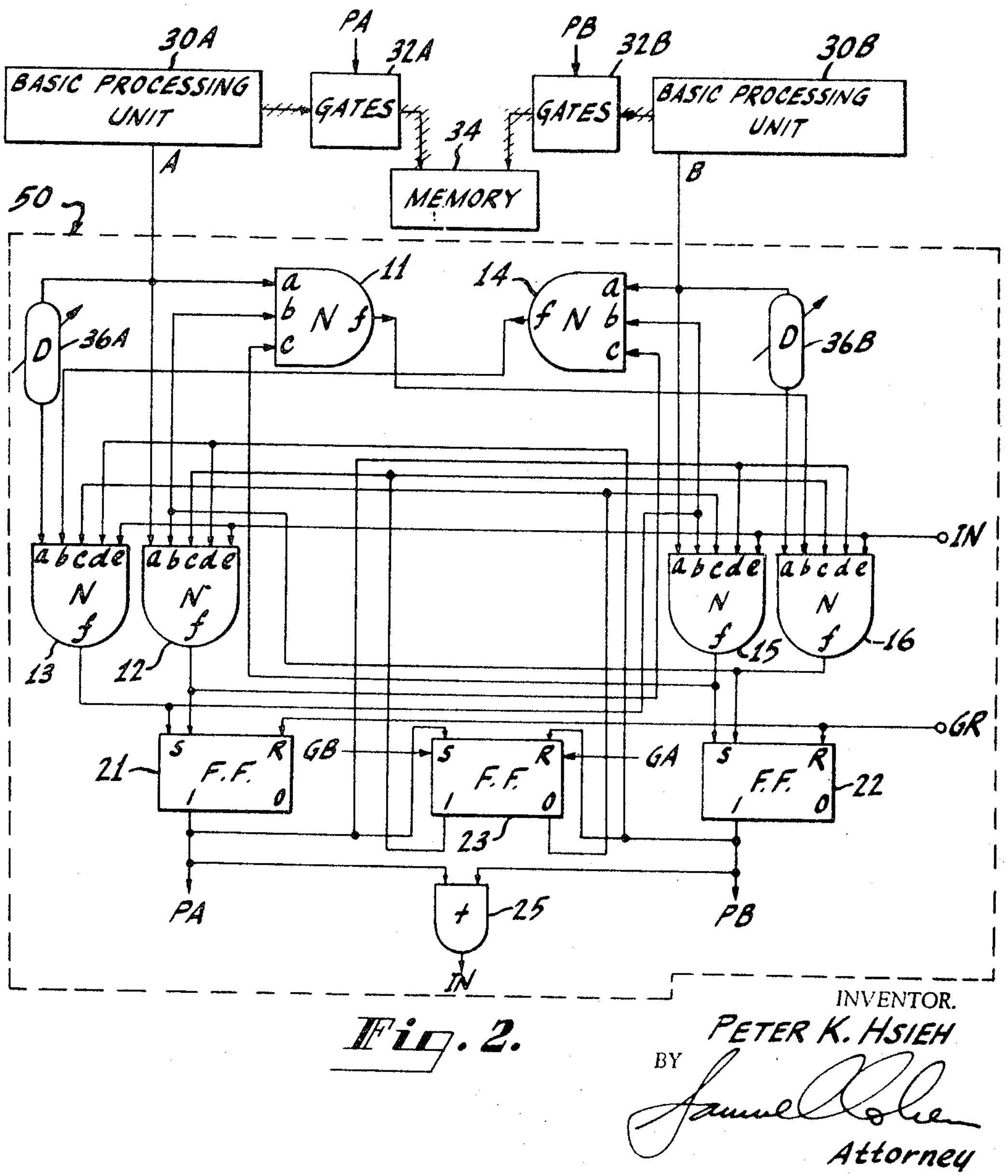
FIGURE 2 is a block circuit diagram of an embodiment of the invention in which there are two input channels.

The system shown in part in FIGURE 2 includes two basic processing units 30A and 30B connected through gates 32A and 32B, respectively, to a common memory 34. The gates 32A and 32B are initially disabled by input commands PA=0 and PB=0. Accordingly, the basic processing units are initially prevented from accessing the memory.

The two processing units are connected to the priority circuit of the present application, shown within the dashed block 50. The processing unit 30A applies a signal A directly to the priority circuit and the processing unit 30B applies a signal B directly to the processing unit. The signals A and B normally represent the bit 1, however, when a processing unit desires access to the memory, its signal A or B changes to a 0.

The delay means 36A and 36B may be considered to be adjustable delay means, as indicated by the arrows. It may be assumed, for the present, that the delay means are both set to insert zero time delay.

The priority circuit 50 includes 6 NOR gates 11–16, respectively, three flip-flops 21–23 and one OR gate 25. NOR gates 11, 12 and 13 are connected to receive the A signal and NOR gates 14, 15 and 16 are connected to receive the B signals. As B=1, these NOR gates are initially all disabled.

The priority circuit 50 issues one of a number of different commands. The command PA=1 indicates that processing unit 30A is granted access to the memory. The command PB=1 indicates that processing unit 30B is granted access to the memory. When PA=PB=0, neither unit may access the memory. The condition PA=PB=1 does not occur, as will become clear from the discussion below.

The initial state of flip-flop 23 determines which one of two concurrently received signals A= 0 and B=0 will be "accepted" by the priority circuit. If the flip-flop 23 is initially in a reset condition, achieved by applying a signal GA=1 (grant channel A priority) to its reset terminal, the A signal is accepted. The corresponding processing unit 30A is then granted access to the memory 34 in preference to unit 30B. If, on the other hand, the flip-flop 23 is initially in a set condition, the B signal is accepted and its processing unit 30B is granted priority over unit 30A.

The operation of the circuit of FIGURE 2 may be better understood by assuming certain initial conditions. First, assume that all of the flip-flops 21, 22 and 23 are reset and that AB=1. As mentioned above, the reset condition of flip-flop 23 implies that signal A will have priority if both signals A and B change to 0 at the same time. Table I below shows, in Boolean terms ,the initial condition of the circuit.

TABLE I

| Stage | Pin | Binary Digit Present | Stage | Pin | Binary Digit Present |
|---|---|---|---|---|---|
| 11---------- | a | 1 | 15--------- | a. | 1 |
| | b | 0 | | b | 0 |
| | c | 0 | | c | 1 |
| | f | 0 | | d | 0 |
| | | | | e | 0 |
| 12---------- | a--------- | 1 | | f | 0 |
| | b | 0 | | | |
| | c | 0 | 16--------- | a | 1 |
| | d | 0 | | b | 0 |
| | e | 0 | | c | |
| | f | 0 | | d | 0 |
| | | | | e | 0 |
| 13---------- | a--------- | 1 | | f | 0 |
| | b | 0 | | | |
| | c | 1 | 21--------- | S | 0 |
| | d | 0 | | R | 0 |
| | e | 0 | | 1 | 0 |
| | f | 0 | | | |
| | | | 22--------- | S | 0 |
| 14---------- | a | 1 | | R | 0 |
| | b | 0 | | l | 0 |
| | c | 0 | | | |
| | f | 0 | 23--------- | S | 0 |
| | | | | R | 0 |
| | | | | 1 | 0 |
| | | | | 0 | 1 |

It may be observed from the table that flip-flop 23, which is reset, disables gates 13 and 15. Assume now that both A and B change to 0 at the same time. All three inputs to NOR gate 11 are now 0 so that it produces an output $f=1$. This output applied to NOR gate 16 disables NOR gate 16. As NOR gates 15 and 16 are both disabled, the path between the input terminal for signal B and the flip-flop 22 is blocked.

When B changes to 0, NOR gate 14 becomes enabled and its $f$ output acts as a disabling signal for NOR gate 13. However, NOR gate 13 is already disabled by flip-flop 23.

The bit A=0 is also applied to NOR gate 12 and enables this gate since all other of its inputs are also 0. Enabled gate 12 sets flip-flop 21 and the latter produces an output PA=1. The PA=1 signal primes gates 32A and these gates permit basic processing unit 30A to access the common memory 34. Flip-flop 22 remains reset so that PB remains 0. Therefore, gates 32B remain disabled and basic processing unit 30B is denied access to the memory.

The signal PA=1 also enables OR gate 25 and its output IN=1 then serves as a disabling signal for NOR gates 13, 12, 15 and 16. This isolates the flip-flops 21 and 22 from the signals A and B. In other words, after the signal IN=1 occurs, signals A and B can be changed from 0 back to 1 without interrupting the memory operation.

The signal PA=1 also acts as a set signal for flip-flop 23. As will be shown shortly, when flip-flop 23 is set, priority is granted to signal B over signal A.

After the memory completes its operating period, the general reset command GR=1 is generated. This signal resets flip-flops 21 and 22 and the IN output of gate 25 again assumes the value 0. The memory is thereupon ready for its next operating period, one during which signal B is granted priority.

Summarizing the circuit operation discussed above, when flip-flop 23 is in a reset condition, the circuit of FIGURE 2 grants priority to the signal A=0 over the signal B=0, if both signals should occur at the same time. This granting of priority is manifested by the generation of the signal PA=1 (PB remains 0) and the disabling of the NOR gates 13, 12, 15 and 16. These gates are disabled by the signal IN=1. Shortly after accepting the signal A=0, the circuit sets flip-flop 23. The latter action prepares the circuit to grant priority to signal B=0 over signal A=0 if during the next access request the signals A and B both become equal to 0 at the same time.

In the discussion above, it is assumed that when A changes to 0, the output of enabled NOR gate 11 immediately disables NOR gate 16. In practice, if A and B change to 0 at the same time and if the delay means 36B is inserting 0 delay, both gates 12 and 16 are instantaneously enabled. However, NOR gate 11 is also instantaneously enabled and it disables gate 16 substantially instantaneously. In circuits which have been built, measurements have shown that gate 16 does produce a short spike under these circumstances having a duration of about 3 nanoseconds at its base and relatively low amplitude. This spike is of insufficient duration or amplitude adversely to affect the circuit operation. It neither sets flip-flop 22 nor disables gate 12.

Assume again that the same initial circuit conditions prevail as are shown in Table I above. Assume also that B changes to 0 and A remains 1.

Table I indicates that the reset flip-flop 23 disables NOR gates 13 and 15. The A=1 signal disables gate 12 (and also gates 11 and 13). When B changes to 0, it enables NOR gate 16 and the enabled NOR gate sets flip-flop 22. The flip-flop thereupon generates the priority signal PB=1, granting priority to the basic processing unit 30B. In other words, gates 32B become primed and processing unit 30B has access to the memory 34. The signal PA remains equal to 0 so that gates 32A remain disabled.

The signal PB=1 also attempts to reset flip-flop 23, however, flip-flop 23 is already in a reset condition. Therefore, even though processing unit 30B is being serviced, the priority circuit remains in condition to give priority to processing unit 30A if, during the next cycle of operation, signals A and B both become 0 at the same time.

After the signal PB=1 is generated, OR gate 25 generates IN=1 and all of the NOR gates 12, 13, 15 and 16 are locked in a disabled condition. After the memory completes its operation, the signal GR=1 is automatically applied to flip-flops 22 and 21, returning flip-flop 22 to a reset condition. The circuit is now ready again to respond to the signal A=0 or the signal B=0.

From the discussion above, it is believed to be unnecessary to discuss the case in which the signal A=0 arrives while B=1. In this case, assuming the same initial circuit conditions as shown in Table I above, flip-flop 21 becomes set and flip-flop 22 remains reset. The set flip-flop 21 generates the "channel" A priority command PA=1.

Assume now that flip-flops 21 and 22 are originally reset and flip-flop 23 is originally set. Assume also that the signals A and B both represent a 1 initially. The circuit conditions are as shown in Table II below. The set flip-flop 23 grants the signal B priority over the signal A.

TABLE II

| Stage | Pin | Binary Digit Present | Stage | Pin | Binary Digit Present |
|---|---|---|---|---|---|
| 11---------- | a | 1 | 14--------- | a | 1 |
| | b | 0 | | b | 0 |
| | c | 0 | | c | 0 |
| | f | 0 | | f | 0 |
| 12---------- | a | 1 | 15--------- | a | 1 |
| | b | 0 | | b | 0 |
| | c | 1 | | c | 0 |
| | d | 0 | | d | 0 |
| | e | 0 | | e | 0 |
| | f | 0 | | f | 0 |
| 13---------- | a | 1 | 16--------- | a | 1 |
| | b | 0 | | b | 0 |
| | c | 0 | | c | 1 |
| | d | 0 | | d | 0 |
| | e | 0 | | e | 0 |
| | f | 0 | | f | 0 |
| 21---------- | S | 0 | 23--------- | S | 0 |
| | R | 0 | | R | 0 |
| | 1 | 0 | | 1 | 1 |
| | | | | 0 | 0 |
| 22---------- | S | 0 | | | |
| | R | 0 | | | |
| | 1 | 0 | | | |

Assume that under the conditions depicted in Table II, the signals A and B both change to 0 concurrently. The set flip-flop 23 maintains NOR gates 16 and 12 disabled. The B=0 signal enables NOR gate 14 and the *f*=1 output of NOR gate 14 disables NOR gate 13. The B=0 signal enables NOR gate 15 and the enabled NOR gate 15 sets flip-flop 22. The signal PB=1 thereby generated is the channel B priority command. It primes gates 32B granting processing unit 30B access to the memory 34. It also resets flip-flop 23 placing the circuit of FIGURE 2 in condition to give priority to channel A during the next cycle, in a manner similar to that already discussed. The signal PB=1 also enables OR gate 25 and the IN=1 signal produced by the latter disables NOR gates 12, 13, 15 and 16. After the signal IN=1 occurs, the signals A and B can be changed to 1 without interrupting the memory operation.

After the common memory 34 completes its operation, the signal GR=1 is generated, resetting flip-flops 21 and 22. The signal IN thereupon changes to 0 placing the circuit in condition again to operate.

Other aspects of the operation of the circuit of FIGURE 2 are believed to be clear from the discussion above. In brief, regardless of the initial setting of flip-flop 23, if one signal, such as A, arrives before the other signal, such as B, the A signal is given priority over the B signal. If both signals A and B occur concurrently, the state of flip-flop 23 will determine which one of these two signals assumes control.

With minor circuit adjustment it is possible to permit the later arriving one of signals A and B to assume control provided that it does not arrive later than the other signal by more than a given time interval. For example, suppose it is desired that signal A have priority over signal B if it arrives before signal B or if it arrives at the same time as signal B, or if it arrives not more than a pre-set delay, say 50 nanoseconds, after signal B. Such operation is achieved by adjusting delay line 36B to insert a 50 nanosecond delay and adjusting delay line 36B to insert zero delay. In a similar manner, delay line 36B may be adjusted to insert zero delay and delay line 36A, which is in series with path taken by signal A, can be adjusted to insert some preset delay. This permits a B=0 signal which is generated not more than the preset delay interval after an A=0 signal, to assume control.

The placement of the delay lines 36A and 36B is such that they do not introduce any unnecessary delays in the system operation. For example, if channel A has priority and the A=0 signal occurs first or even if it occurs simultaneously with the B=0 signal, the A=0 signal immediately enables gate 12. The delay lines **36*a* and 36*b*** are not in the path taken by the A=0 signal and do not delay the generation of the PA=1 signal.

The connection from the *f* output terminals of NOR gates 12 and 15 to the *c* input terminals of NOR gates 14 and 11 is to eliminate any tendency toward undesired circuit operation. Such undesired operation could occur if the signal IN=1 was generated later than a change in state of flip-flop 23 caused by the PA=1 or PB=1 signal. However, the flip-flop 23 readily may be designed to change its state somewhat more slowly than the turn-on-time of OR gate 25 in which case the circuit can be simplified by the deletion of the lines extending to the *c* terminals of the NOR gates 11 and 14.

In some data processing machines, the signal A and its complement $\overline{A}$ and the signal B and its complement $\overline{B}$ are available. In these cases, it is possible to simplify the circuit of FIGURE 2 in the manner shown in FIGURE 4. The basic processing units 30, the gates 32 and the memory 34 are not shown in this figure in order to simplify the drawing. The NOR gates 11 and 14 are no longer necessary in view of the availability of the complement signals $\overline{A}$ and $\overline{B}$. The signal $\overline{A}$ is connected to the *b* input terminal of gate 16 (in the circuit of FIGURE 2 the *f* output of gate 11 is connected instead to this terminal).

The signal $\overline{B}$ is connected to the *b* terminal of gate 13 (in the circuit of FIGURE 2 the *f* output of gate 14 is connected to this terminal).

Figure 4:
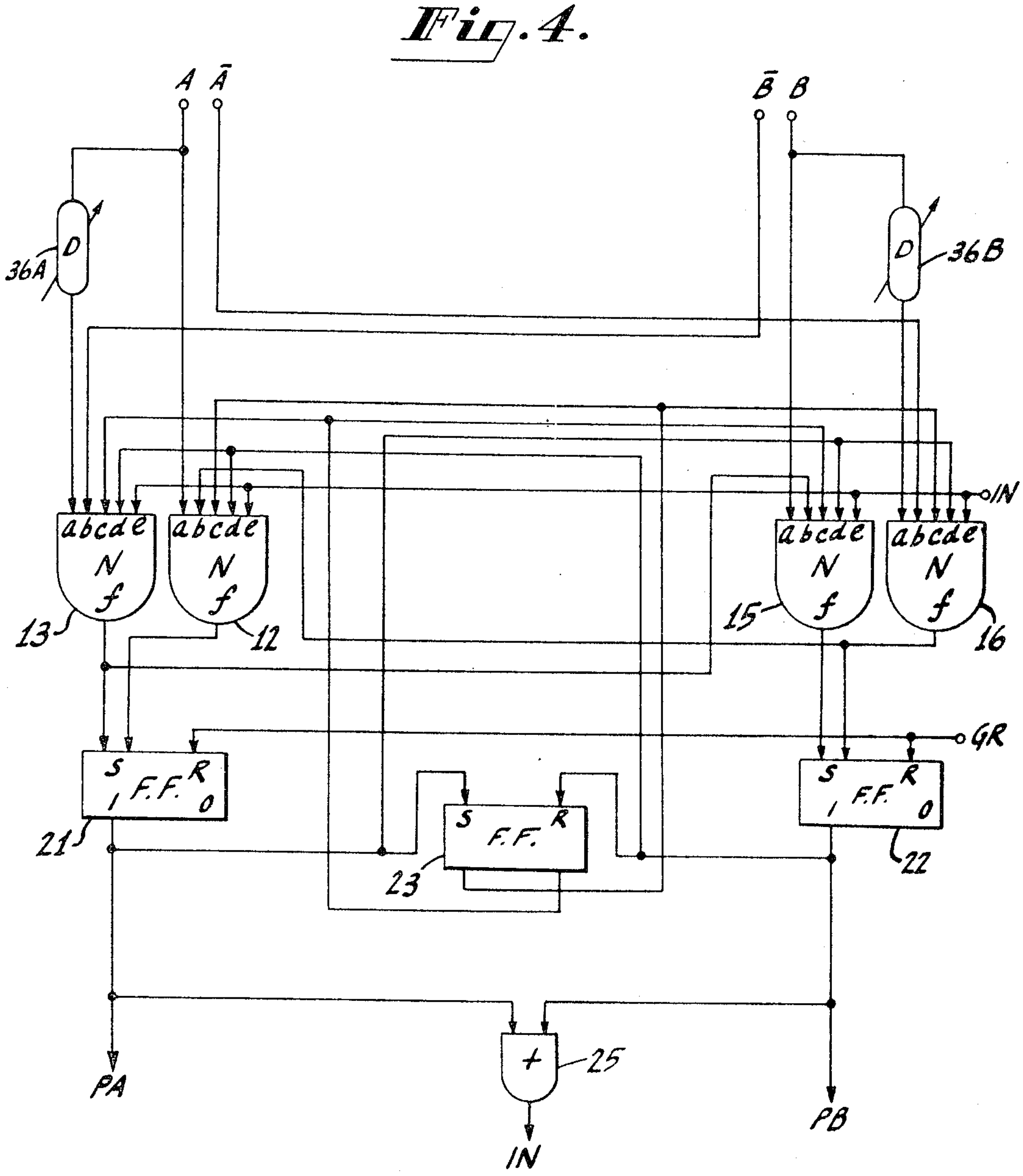
FIGURE 4 is a block circuit diagram of a modified form of the circuit of FIGURE 2.

The operation of the circuit of FIGURE 4 is quite analogous to that of the circuit of FIGURE 2, and need not be discussed in detail.

Figure 3:
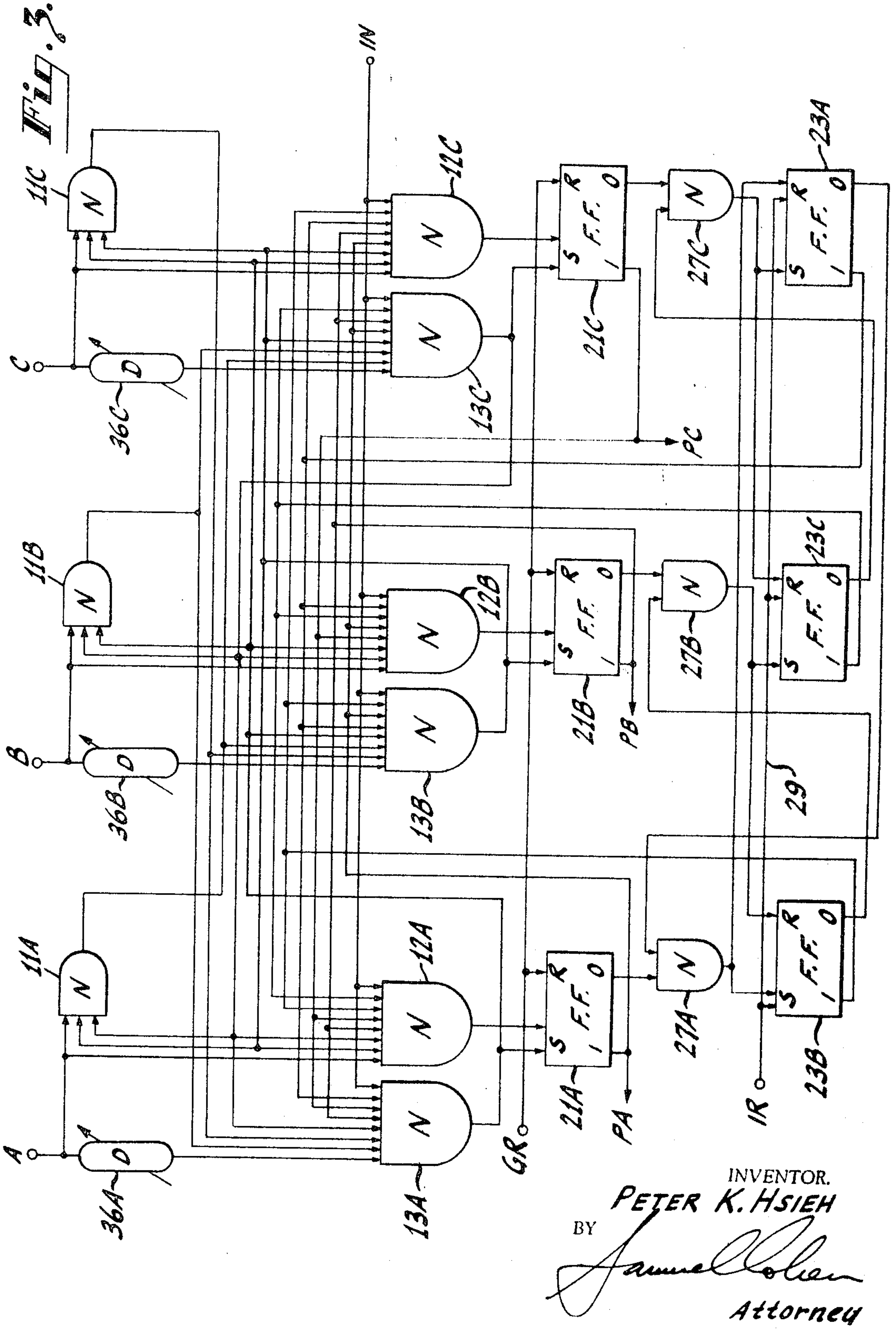
FIGURE 3 is a block circuit diagram of an embodiment of the invention in which there are three input channels.

An embodiment of the invention suitable for use with three different basic processing units is shown in FIGURE 3. To simplify the drawing, the processing units providing the signals A, B and C are not shown nor is the memory which is common to the three units. It is to be understood that these units and the gates between the respective units in the memory are similar to what is shown in FIGURE 2.

Each channel comprises 4 NOR gates and 2 flip-flops. For example, channel A includes NOR gates 11A, 12A and 13A which are analogous to the NOR gates 11, 12 and 13, respectively, of FIGURE 2; a flip-flop 21A which is analogous to the flip-flop 21 of FIGURE 2; and a flip-flop 23B which is analogous to the flip-flop 23 of FIGURE 2. The flip-flop 23B, when set, assigns priority to channel B. In a similar manner, in the other 2 channels the flip-flop 23C, when set, assigns priority to channel C and the flip-flop 23A, when set, assigns priority to channel A. Each channel also includes a fourth NOR gate, such as shown at 27A in channel A, coupled between its two flip-flops.

As in the circuit of FIGURE 2, the signals A, B and C are all initially indicative of a 1. The flip-flops 21 are all initially reset. One of the flip-flops 23 is initially set and all others are reset. In the example chosen for illustration, the initial reset signal IR resets flip-flops 23C and 23A and sets flip-flop 23B, so that channel B has priority over channels A and C. By changing the connection, it is possible readily to change the initial priority allocation. The signal IR=1 is generated when the power of the system is first turned on.

The operation of the circuit will be illustrated by a few examples. Assume first that the delay lines 36A, 36B and 36C all insert zero delay. Assume also that all three signals A, B and C concurrently change to 0 with the circuit conditions as described above. The set flip-flop 23B disables NOR gates 12A, 13B and 12C. The A=0 signal enables NOR gate 11A and the latter disables NOR gate 13C and also applies a disabling signal to NOR gate 13B (the latter is already disabled). The B=0 signal enables NOR gate 11B and it applies a disabling signal to NOR gates 13A and 13C (the latter is already disabled). The C=0 signal enables NOR gate 11C and the latter applies a disabling signal to already disabled NOR gates 13B and 13A. Summarizing, of the 6 NOR gates 12 and 13, all with the exception of NOR gate 12B are disabled. The B=0 signal enables NOR gate 12B (as the remaining seven inputs are also 0) and the latter sets flip-flop 21B. The flip-flop thereupon produces the command PB=1 which indicates that the basic processing unit associated with channel B is granted access to the memory. The signals PA and PC remain 0 and these signals prevent the remaining 2 processing units from gaining access to the memory. The signal PB=1 is also fed back to certain of the NOR gates to maintain these NOR gates in a disabled condition.

When the flip-flop 21B becomes set, its 0 output terminal produces a 0. This signal enables NOR gate 27B and the latter sets flip-flop 23C and resets flip-flop 23B. The circuit is therefore placed in condition so that upon the completion of the present cycle, channel C will have priority rather than channel B. After the memory completes its operation, the signal GR=1 is generated to reset flip-flops 21, and the circuit is in condition to assign priority to channel C over channels B and A.

The signal IN=1, for locking the NOR gates 12 and 13 in a disabled condition, may be generated in a manner similar to that shown in FIGURE 2. An OR gate (not shown) is connected to receive the outputs PA, PB and PC of the flip-flops 21A, 21B and 21C, respectively, to produce the IN signal.

The operation of the circuit of FIGURE 3, under other conditions, is believed to be self-evident from the explanation of FIGURE 2 which already has been given. If any one of the A, B and C signals changes to 0 before the others change to zero, the channel associated with the 0 signal is given priority over the others. After a channel is given priority, the next channel is automatically selected as the prior channel for the next cycle of operation. Thus, as demonstrated above, after channel B is granted priority, then channel C is granted priority. Also, after channel C is granted priority, then channel A is granted priority. Finally, after channel A is granted priority, channel B is granted priority.

The purpose of the delay lines 36A, 36B and 36C is the same as that discussed in connection with the corresponding elements of FIGURE 2.

While not shown, it is evident that the circuit of FIGURE 3 can be simplified if, in addition to the signals A, B and C, their complements $\overline{A}$, $\overline{B}$ and $\overline{C}$ are also present. In this case, the NOR gates 11A, 11B and 11C may be omitted, just as in the circuit of FIGURE 4.

The circuits illustrated employ NOR gates. It is to be understood, of course, that with suitable choice of conventions and signal polarities, other gates may be used instead. As one example, the circuit may be implemented with AND gates.

What is claimed is:

1. A priority circuit comprising, in combination:
first and second signal paths connected between a first input terminal and first output terminal means;
third and fourth signal paths connected between a second input terminal and second output terminal means;
gate means in each said path, the gate means in the second and fourth of said paths being in condition to be enabled in response to an enabling signal at said first and second input terminals, respectively;
storage means coupled to the gate means in the first and third of said paths for maintaining said gate means in a disabled condition;
means responsive to an enabling signal at the first terminal for appling a disabling signal to the gate means in said fourth path; and
means responsive to an enabling signal at said second input terminal for applying a disabling signal to the gate means of said first path, whereby, when concurrent enabling signals are applied to said first and second input terminals, the enabling signal applied to said first terminal enables the gate means in said second path.

2. A priority circuit as set forth in claim 1, further including means for causing said storage means to remove the disabling signal from the gate means in the first and third paths and to disable instead the gate means in said second and fourth paths.

3. A priority circuit as set forth in claim 1, further including a flip-flop connected to each output terminal, respectively, and means responsive to a change in state of either flip-flop for applying a disabling signal to the gate means in all four paths.

4. A priority circuit as set forth in claim 1, wherein all of said gate means comprise NOR gates and wherein both means responsive to an enabling signal also comprise NOR gates.

5. A priority circuit as set forth in claim 3, further including means responsive to a change in state of one said flip-flops for causing said storage means to remove its disabling signal from the gate means in the first and third paths and to disable instead the gate means in said second and fourth paths, and means responsive to a change in state of the other of said flip-flops, for causing said storage means to remove its disabling signal from the gate means in the second and fourth paths and to disable instead the gate means in said first and third paths.

6. A priority circuit as set forth in claim 1, further including delay means in series with at least one of said first and fourth paths and located ahead of the gate means in its path.

7. A priority circuit comprising, in combination:
first and second signal paths connected between a first input terminal and first output terminal means;
third and fourth signal paths connected between a second input terminal and second output terminal means;
gate means in each said path, the gate means in the second and fourth of said paths being in condition to be enabled in response to an enabling signal at said first and second input terminals, respectively;
a first flip-flop initially in a first state coupled to the gate means in the first and third of said paths for applying a disabling signal to said gate means in said first and third paths and coupled to the gate means in the second and fourth of said paths for applying a priming signal to the gate means in said second and fourth paths;
means responsive to an input command for applying an enabling signal to the first terminal for enabling the gate means in the second path and for applying a disabling signal to the gate means in said fourth path; and
means responsive to a second input command for applying an enabling signal to said second input terminal and for applying a disabling signal to the gate means in said first path.

8. A priority circuit as set forth in claim 7, further including a second flip-flop connected to said first output terminal means, responsive to the output produced by the gate means in the first or second of said paths, for applying a signal to said first flip-flop for placing it in its other state.

9. A priority circuit as set forth in claim 8, further including a third flip-flop connected to said second output terminal means, responsive to the output produced by the gate means in the third or fourth of said paths for applying a signal to said first flip-flop for placing it in its first storage state.

10. A priority circuit as set forth in claim 7, further including means responsive to the presence of a signal at either said first output terminal means or said second output terminal means for disabling the gate means in all of said signal paths.

11. A priority circuit as set forth in claim 7, further including a delay means in series with at least one of said first and fourth signal paths and located ahead of the gate means in its path.

References Cited

UNITED STATES PATENTS

| | | | |
|---|---|---|---|
| 2,985,773 | 5/1961 | Dobbie | 328—92 |
| 3,112,450 | 11/1963 | Krause | 328—152 |
| 3,258,677 | 6/1966 | Carruth et al. | 307—203 |

ARTHUR GAUSS, Primary Examiner

DAVID CARTER, Assistant Examiner

U.S. Cl. X.R.

307—207, 215